No. 703,324. Patented June 24, 1902.
O. F. WALLIHAN.
SILO.
(Application filed May 24, 1901.)
(No Model.)
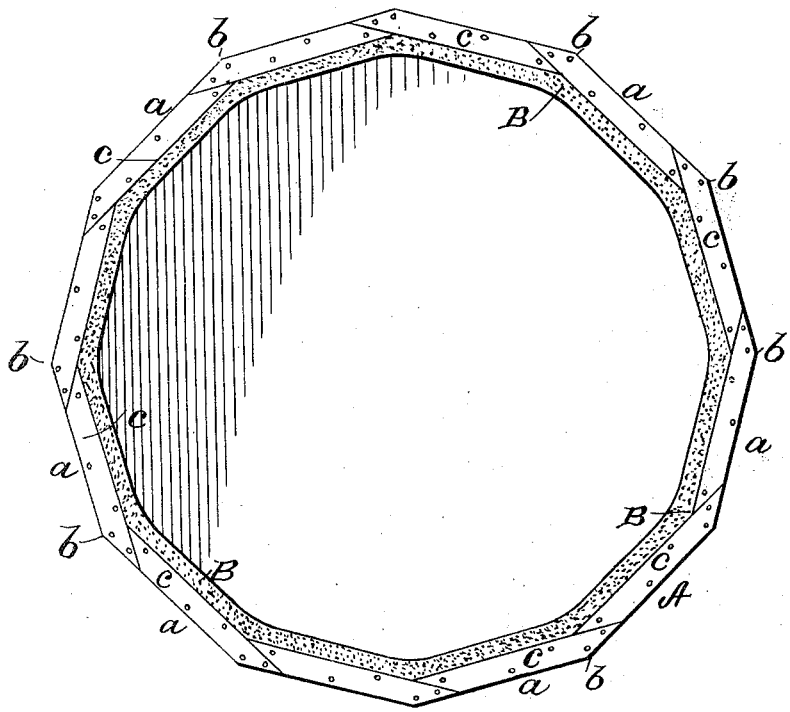
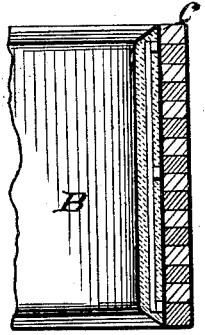
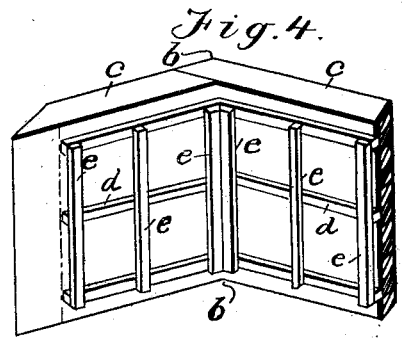
WITNESSES:
W. R. Edelin
Amos W. Hart
INVENTOR
Orlando F. Wallihan
BY Munn & Co.
ATTORNEYS

UNITED STATES PATENT OFFICE.

ORLANDO FLOWER WALLIHAN, OF RELIANCE, VIRGINIA.

SILO.

SPECIFICATION forming part of Letters Patent No. 703,324, dated June 24, 1902.

Application filed May 24, 1901. Serial No. 61,743. (No model.)

*To all whom it may concern:*

Be it known that I, ORLANDO FLOWER WALLIHAN, of Reliance, in the county of Warren and State of Virginia, have invented a new and useful Improvement in Silos, of which the following is a specification.

It is the object of my invention to provide an improved silo or inclosure for preserving ensilage or green fodder.

It is very desirable and, in fact, necessary to attainment of the best result in preservation of fodder that the vertical wall of a silo shall have no acute angles or corners, and therefore a circular form is the ideal one. This form is, however, difficult to construct and also expensive, and I have devised a silo of polygonal shape which closely approximates the circular and have applied cement-holding laths thereto in such manner that the cement does not become cracked or detached by vertical expansion of the silo-wall.

The details of construction are as hereinafter described, reference being had to accompanying drawings, in which—

Figure 1 is a plan view of the vertical wooden wall of my improved silo. Fig. 2 is a side view of a portion of the same. Fig. 3 is an enlarged vertical section of a portion of the silo-wall provided with the cement lining. Fig. 4 is a perspective view of a portion of the inner side of the silo-wall with lath skeleton, applied as required, to fur the cement. Fig. 5 is a plan view illustrating the manner of sawing a board to produce the particular sections or pieces required to form the silo-wall.

The vertical wall A of the silo describes a many-sided polygon, there being twelve equal sides $a$ and obtuse angles $b$ of thirty degrees, as shown in Fig. 1. This number of sides has been demonstrated to be preferable. The same is formed of a series of boards or planks $c$, laid flatwise and horizontally one upon another and secured together by nails, as shown in Fig. 1. Each board or plank $c$ has straight sides and ends, the latter being cut at an angle and the inclinations being in opposite directions instead of parallel, so that each end presents an acute and an obtuse angle. The boards $c$ may be cheaply and quickly produced of the required length by sawing a long one $c'$ on the transverse dotted lines indicated in Fig. 5.

The several boards $c$ are laid so as to break joints and overlap for a portion of their length and also abut at their ends, as shown in Figs. 1 and 2. Thus each board overlies the one below for a portion of the length of each, and one inclined end of each abuts the next board in the same plane or horizontal series, the other inclined end appearing on the outer side of the structure at an angle $b$ thereof.

Doors and a suitable cover are provided in practice, but omitted from the drawings.

The inner side of the polygonal wall A is covered with a thick coat or lining B of hydraulic cement, as shown in Figs. 1 and 3. To hold this, I secure three laths $d$, Fig. 4, horizontally parallel to the inner surface of each of the plane sides $a$, and to such furring $d$ I nail vertical laths $e$, which serve as a carrier or support for the cement B. The wooden wall A expands vertically by effect of moisture and contracts when dried, more or less. Such expansion and contraction is chiefly taken up by the nails holding the laths $e$ in place without affecting the body of the cement B to a degree capable of producing cracks, which it is particularly desirable to avoid in order to prevent admission of air and the consequent deterioration of the fodder stored in the silo. In further explanation of this feature of my invention I will state that the essential thing is the arrangement of the cement-carrying laths $e$ at right angles to the wooden strips $c$, or rather to the grain of the same, and when the wall A expands vertically the nails securing the said laths are bent or inclined slightly up or down in a degree corresponding to such expansion of the wall; but since the laths remain spaced the same distance apart it is apparent the cement body B will retain its solid form and present an unbroken face. This result is of the greatest importance in silos, since it insures an almost perfect exclusion of air and moisture.

What I claim is—

The improved silo having the form of a many-sided polygon and composed of wooden strips, or sections, laid horizontally and lapped upon each other as described, furring-laths secured to the inner side of the polygonal
5 wall, and a series of cement-carrying laths nailed vertically upon such furring, and the cement coat applied to the vertical laths and presenting an unbroken surface, as shown and described.

ORLANDO FLOWER WALLIHAN.

Witnesses:
J. D. FORSYTH,
J. F. FORSYTH.